Figure 1:
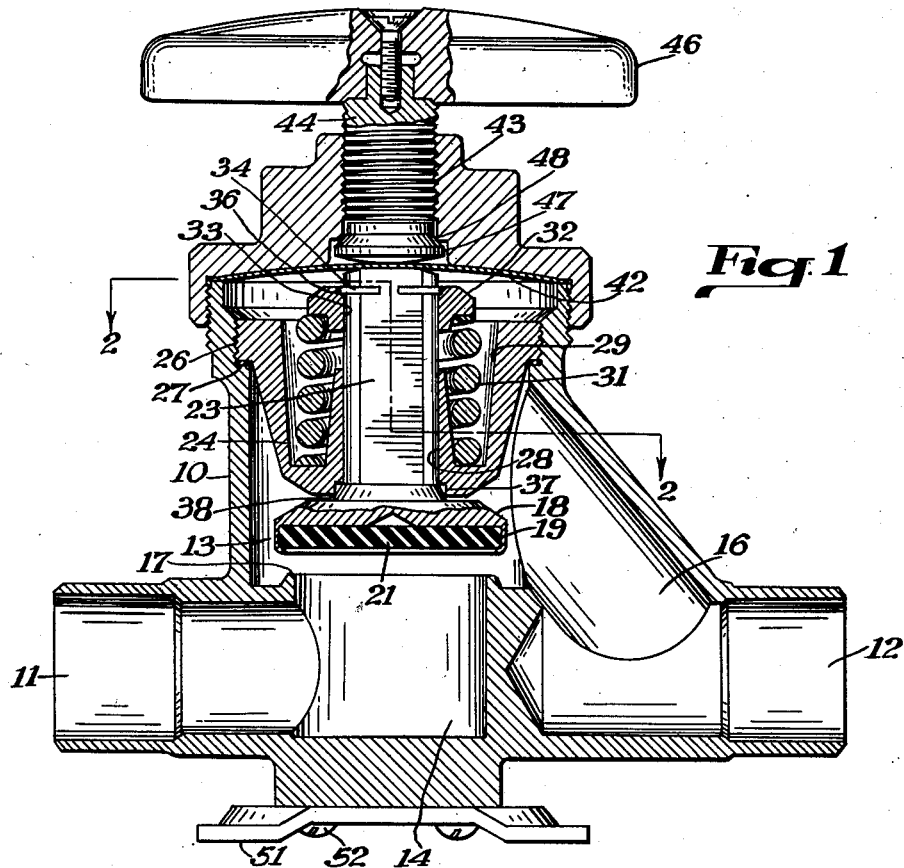

June 16, 1953

G. O. R. LINDGREN 2,642,255

PACKLESS VALVE

Filed Dec. 10, 1947

INVENTOR.
GEORGE O. R. LINDGREN.
BY Richey & Watts
ATTORNEYS.

Patented June 16, 1953

2,642,255

UNITED STATES PATENT OFFICE 2,642,255

PACKLESS VALVE

George O. R. Lindgren, Willoughby, Ohio, assignor to The Weatherhead Company, Cleveland, Ohio, a corporation of Ohio Application December 10, 1947, Serial No. 790,855

2 Claims. (Cl. 251—32)

This invention relates to valves, and is particularly directed to a valve which is automatically back-seated under the action of a spring when the valve is fully opened and which embodies new principles of construction facilitating manufacture, assembly, and repair of the valve.

The principal objects of the invention are:

To provide a valve of improved construction;

To provide a valve which back-seats itself upon opening of the valve;

To provide a packless valve in which the diaphragm may be readily replaced while the valve is in service;

To provide a valve in which the movable valve member and associated parts may be easily assembled and the resulting subassembly may be readily assembled with the remaining parts of the valve without special equipment; and To provide a valve of the character described which is economical to manufacture and convenient to service.

Other objects and advantages, more or less ancillary to the foregoing, and the manner in which all the various objects are realized will appear in the following description, which, considered in connection with the accompanying drawing, sets forth the preferred embodiment of the invention.

Figure 2:
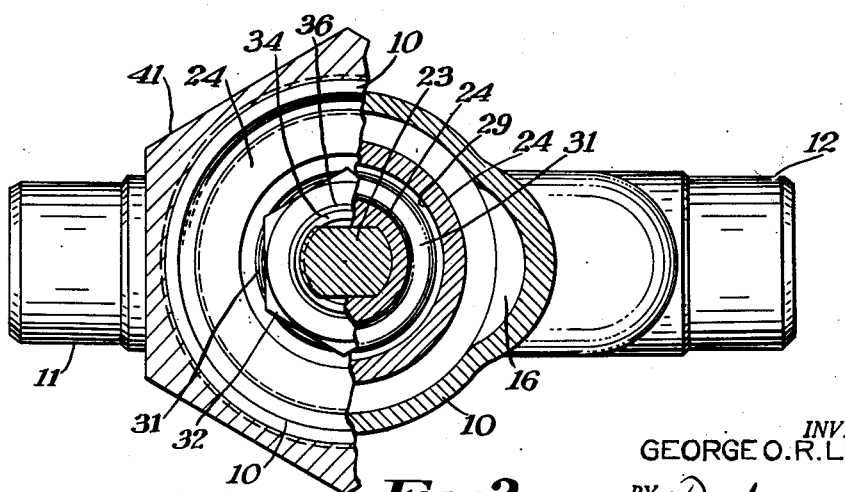

Referring to the drawings:

Fig. 1 is a sectional view taken on the medial plane of a valve in accordance with the invention; and Fig. 2 is a sectional view taken on the planes indicated by the line 2—2 in Fig. 1.

The valve comprises a body 10 provided with an inlet 11 and an outlet 12 which may be formed in any desired manner for connection to conduits or other fittings. The body of the valve is bored to provide a chamber 13, an extension 14 of which communicates with the inlet passage 11. A passage 16 extends from the side of the chamber 13 to the outlet passage 12. The shoulder between the chamber 13 and the inlet bore 14 is formed with an annular lip 17 circumjacent the latter, which forms the seat for a movable valve member 18. The valve is shown in the open condition in Fig. 1, and is closed by forcing the disk 18 against the seat 17.

The head 18 of the valve plunger assembly is formed with a thin depending flange 19, the lower edge of which may be spun inward to retain a resilient seat disk 21 of neoprene or equivalent material. The valve member 18 is integral with a plunger 23 of non-circular cross section, preferably of the section shown most clearly in Fig. 2, of the form of a circle with equal segments removed from opposite sides. The plunger 23 is guided for reciprocation in an annular member 24, the upper portion of which is threaded at 26 for assembly into the correspondingly threaded valve body and is formed with a flange for seating against a gasket 27 supported by a shoulder within the valve body. The guide member 24 is formed with an internal passage 28 of the same form as the plunger 23, so that the plunger is not rotatable within the guide, but with sufficient clearance to permit free reciprocation of the plunger.

The valve guide is also formed with an annular recess 29 which houses a strong compression spring 31 which is coupled to the valve plunger so as to tend to open the valve. The upper end of the spring 31 bears against a retainer 32, the periphery of which is hexagonal, as shown in Fig. 2, or otherwise formed for the application of a wrench to rotate the retainer, the plunger 23, and the annular member 24. The internal passage 33 of the retainer is formed for non-rotative engagement with the valve plunger in the same manner as the passage 28 in the guide member. The plunger 23 is notched adjacent its upper end to receive a snap ring 34 which serves to lock the spring retainer 32 in position and is in turn held positively in place by engagement within the countersunk upper end 36 of the opening 33 in the retainer.

The parts thus far described may be assembled by inserting the valve plunger into the guide, placing the spring 31 and retainer 32 over the guide and plunger respectively, forcing the retainer 32 downward to compress the spring, inserting the snap ring, and releasing the retainer, whereupon the retainer 32 and snap ring 34 are held locked in position under the action of the valve-lifting spring 31. This subassembly may then be assembled into the body of the valve by rotating the retainer 32 by a wrench to screw the guide member 24 into the body. It will be seen that this operation is one of great simplicity, requiring no special equipment.

The lower end of the valve guide 24 is faced and is counterbored as indicated at 37 to provide a seat for a conical portion 38 of the valve plunger adjacent the upper surface of the head 18, the greatest diameter of the cone being greater than that of the counterbore 37. As will be apparent, the relatively strong spring 31 will tend to bring the cone 38 into tight sealing engagement with the edge of the counterbore 37 to prevent flow of gas along the stem when the valve is opened. This not only assists in the prevention of leakage from the valve in service, but also makes possible the replacement of the diaphragm of the valve without removing the valve from service, as will be seen.

The upper portion of the valve body is externally threaded to receive a valve cap 41, and the margin of a flexible diaphragm 42 is compressed between the lower face of the cap and the upper annular face of the valve body, these faces being machined to provide a tight sealing engagement with the edge of the diaphragm. The valve cap is drilled and tapped at 43 for a threaded stem 44, on the upper end of which is mounted a handle 46. The inner end of the stem 44 is provided with a head 47 having a conical upper surface adapted to engage the margin 48 of a counterbore of the cap, so that the stem 43 seats against the cap when the handle is rotated to withdraw the stem to the fullest extent as illustrated in Fig. 1. The lower end of the stem 44 and the upper end of the valve plunger 23 are slightly domed for engagement of the diaphragm 42 over a limited area. The diaphragm 42 is provided to prevent leakage from the valve, and thus eliminates the need for packing for the stem 44. In the event of wear of the diaphragm, it may be replaced by unscrewing the valve cap 41, which preferably is formed with a hexagonal periphery. It should be noted that upon opening the valve, the backseat 38 closes before the operating stem head 47 seats, so that the full seating of the former under the action of the spring 31 may occur. The valve may be provided with a mounting foot 51 secured to the valve body by screws 52.

The valve is closed by turning the handle 46 to rotate the operating stem 44 which is thus screwed into the valve cap, driving the plunger 23 downward by pressure transmitted through the diaphragm, the latter flexing to permit this movement. Upon full seating of the valve, the disk 21 engages the annular seat 17 to prevent flow between the inlet and outlet connections 11 and 12.

The valve plunger assembly may be removed from the valve body for inspection or replacement of the seat disk 21 by unscrewing the guide 24 by the application of an ordinary wrench to the spring retainer 32.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A valve comprising a body formed with a valve seat therein, a reciprocable plunger, a removable guide for the plunger threadable into the body and including a back seat for the plunger, the plunger being reciprocable in the guide to engage the valve seat and back seat alternatively, and being rotatively interlocked with the guide in all positions so that the guide may be threaded into the body by rotation of the plunger, a ring rotatively interlocked with the plunger in both directions of rotation and configured for application of a wrench whereby rotation of said ring rotates said guide through said plunger, and a spring compressed between the guide and the ring to urge the plunger toward the back seat.

2. A valve comprising a body formed with a valve seat therein, a guide threaded into the body, a back seat on the guide, a plunger reciprocable in the guide, a head on the plunger reciprocable alternatively into engagement with the valve seat and the back seat, a spring retainer on the plunger, a spring compressed between the guide and the retainer and urging the head toward the back seat, and means for urging the plunger and head toward the valve seat, the plunger being of non-circular cross-section, the guide and retainer having openings for the plunger of corresponding cross-section, and the retainer having a periphery formed for engagement by a wrench, whereby the assembly of guide, plunger, spring, and retainer may be screwed into the valve by application of a wrench to the retainer.

GEORGE O. R. LINDGREN.

References Cited in the file of this patent

UNITED STATES PATENTS

| Number | Name | Date |
|---|---|---|
| 659,288 | Church | Oct. 9, 1900 |
| 663,093 | Hilton | Dec. 4, 1900 |
| 695,588 | Storle | Mar. 18, 1902 |
| 1,235,816 | Kytlica | Aug. 7, 1917 |
| 1,341,544 | Coffin | May 25, 1920 |
| 1,477,154 | Springborn | Dec. 11, 1923 |
| 1,477,578 | Marsh | Dec. 18, 1923 |
| 1,890,505 | Forbes | Dec. 13, 1932 |
| 2,061,028 | Forbes | Nov. 17, 1936 |
| 2,188,850 | Zinkil | Jan. 30, 1940 |
| 2,318,964 | Parker | May 11, 1943 |